United States Patent [19] [11] 4,199,172
Fukunaga et al. [45] Apr. 22, 1980

[54] SEAT BELT RETRACTOR WITH TENSION ELIMINATING MECHANISM

[75] Inventors: Yukio Fukunaga, Yokohama; Ken Kamijo, Chigasaki, both of Japan

[73] Assignee: Nissan Motor Company, Limited, Yokohama, Japan

[21] Appl. No.: 961,949

[22] Filed: Nov. 20, 1978

[30] Foreign Application Priority Data

Jan. 24, 1978 [JP] Japan .................................. 53-6534

[51] Int. Cl.² ............................................. A62B 35/00
[52] U.S. Cl. .................................. 280/807; 242/107.6
[58] Field of Search ............... 280/801, 802, 803, 807, 280/808; 297/474, 475; 242/107.4 R, 107.4 C, 107.4 D, 107.6, 107.12

[56] References Cited

U.S. PATENT DOCUMENTS

| 3,682,412 | 8/1972 | Kuszynski | 242/107.4 R |
| 3,700,184 | 10/1972 | Francis | 242/107.6 |
| 3,908,928 | 9/1975 | Okada | 242/107.4 R |
| 3,917,189 | 11/1975 | Bryll | 242/107.6 |

Primary Examiner—Robert R. Song
Assistant Examiner—Randall A. Schrecengost

[57] ABSTRACT

A seat belt retractor having a tension eliminating mechanism and a belt position memorizing mechanism comprises a shaft on which the belt is wound up when the shaft rotates in one direction, biasing means biasing the shaft to rotate in the one direction, a sun gear fixedly mounted on the shaft, a stationary internal gear mounted around the shaft, a planetary gear operatively interposed between the sun gear and the internal gear, a discal carrier coaxial with the shaft and having thereon a stud on which the planetary gear is journaled an external gear coaxial with the shaft and having a projection which is engageable with another projection formed on the discal carrier when the carrier is rotated relative to the external gear, biasing means biasing the discal carrier to rotate in a direction to allow the projection on the carrier to engage the projection on the external gear, a stopper meshingly engageable with the external gear to lock the same, and an actuator causing the stopper to engage with the external gear when the webbing takes a passenger restraining position.

7 Claims, 14 Drawing Figures

SEAT BELT RETRACTOR WITH TENSION ELIMINATING MECHANISM

FIELD OF THE INVENTION

The present invention relates in general to safety seat belt arrangements equipped in vehicles, and more particularly to a seat belt retractor of a type having tension eliminator.

BACKGROUND OF THE INVENTION

Some seat retractors are so designed as to permit the retractor to exert a retracting force on the belt at all times irrespective of the posture assumed by the passenger restrained thereby. Thus, the belt always applies pressure to the body of the passenger to induce discomfort and increase the rate of fatigue. Thus, hitherto, some passengers have avoided the use of the seat belts for the reasons just set forth.

SUMMARY OF THE INVENTION

Accordingly, it is an object of the present invention to provide an improved seat belt retractor which can eliminate the drawbacks mentioned above.

It is another object of the present invention to provide an improved seat belt retractor which can eliminate the tension applied to the wearer's body when the wearer assumes a position in which the lumbar and dorsal portions of the wearer's back are pressed against the backrest of the seat viz. assumes a fully restrained position.

It is still another object of the present invention to provide an improved seat belt retractor which has position memory responsive to the belt being drawn out of the retractor in excess of a predetermined length so as to be reset and permit the belt to be retracted only the predetermined length whereby upon return of the passenger or wearer to the fully restrained position no tension is exerted on his or her body via the belt.

According to the present invention, there is provided a belt retractor for a safety belt arrangement having a webbing and a housing, comprising: a shaft member axially rotatably mounted in the housing for winding thereon the webbing when rotated about the axis thereof in one direction; first biasing means for biasing the shaft member to rotate in the one direction; an external gear coaxial with the shaft member and rotatable about the axis of the shaft member; a stopper meshingly engageable with the external gear to lock the same with respect to the housing; second biasing means for biasing the stopper to move in a direction disengaging from the external gear; actuator for causing the stopper to be brought into meshing with engagement with the external gear against the force of the second biasing means when the webbing takes a position wherein a passenger is restrained by the webbing; a discal member coaxial with the shaft member and rotatable about the axis of the shaft member; first and second projections respectively mounted on the external gear and discal member to be engageable with each other when its axis with rotated in a direction about the axis thereof with respect to the external gear; third biasing means for biasing the discal member to rotate in the direction relative to the external gear; a stud member mounted on the discal member at a position away from the center of the discal member; a planetary gear journaled on the stud member; an internal gear tightly fixed to the housing to be coaxially mounted around the shaft member; and a sun gear fixedly and coaxially mounted on the shaft member, the planetary gear being operatively interposed between the internal gear and the sun gear and meshingly engaged with the same.

SUMMARY OF THE DRAWINGS

Other objects and advantages of the present invention will become clear from the following description when taken in conjunction with the accompanying drawings, in which.

DESCRIPTION OF THE PREFERRED EMBODIMENTS

Figure 1:
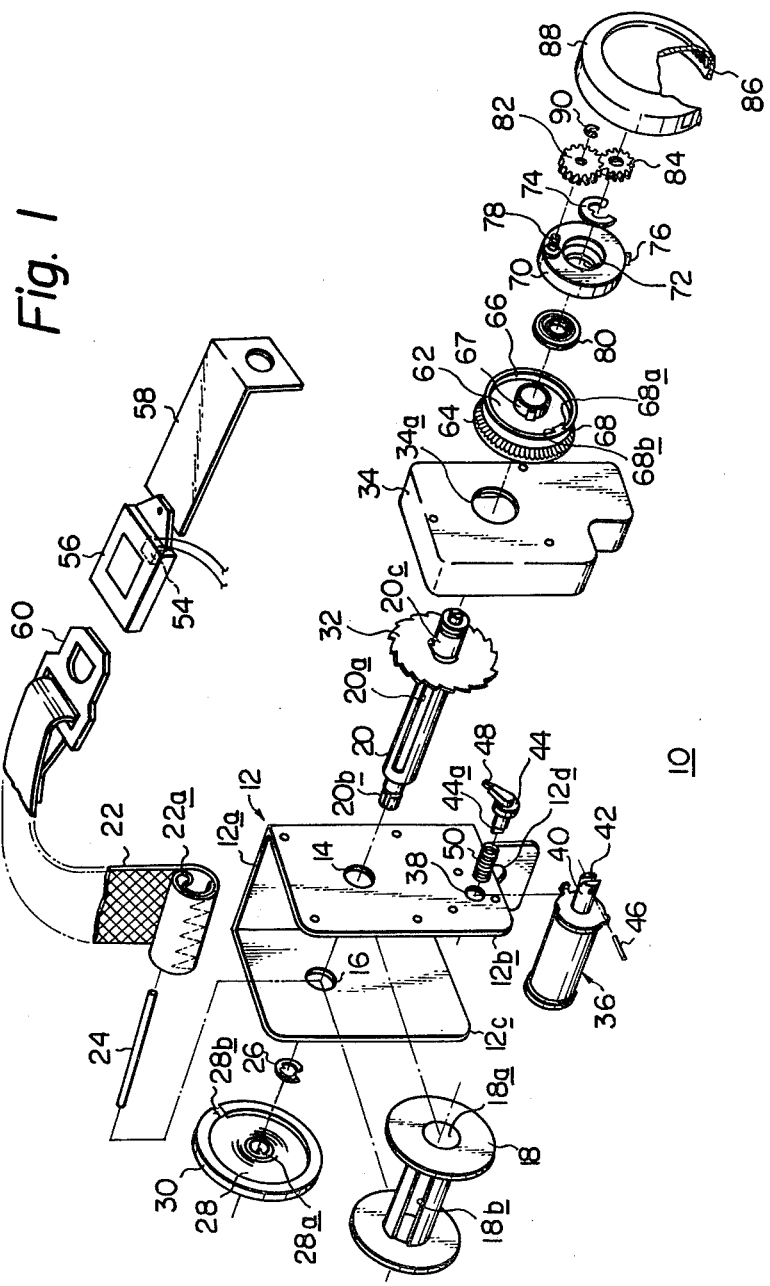
FIG. 1 is an exploded view of a seat belt retractor of a first embodiment according to the invention.

Referring to FIGS. 1 to 6 of the drawings, especially FIG. 1, there is illustrated a first preferred embodiment of the seat belt retractor of the invention, as being combined with a seat belt.

The seat belt retractor generally designated by numeral 10 comprises a generally U-shaped housing 12 having a base portion 12a and a pair of side wall portions 12b and 12c. The housing 12 is adapted to connect to a suitable body portion or a seat portion of a vehicle by bolts (not shown) passing through a hole 12d formed in the base portion 12a thereof. The wall portions 12b and 12c respectively have aligned holes 14 and 16 and receive therebetween a guide reel 18 in a manner that the axis of the reel 18 is aligned with the axes of the holes 14 and 16. A hollow shaft 20 is adapted to pass through an axial hole 18a of the guide reel 18 with the ends thereof rotatably journaled in the holes 14 and 16 of the side wall portions 12b and 12c so that the reel 18 is rotatably supported in the housing 12. The hollow shaft 20 is formed with a longitudinally extending slit 20a. A webbing 22 having a looped end 22a is passed through a longitudinally extending slit 18b formed in the guide reel 18 and through the slit 20a of the shaft 20 allowing the looped end 22a thereof to be received in the hollow of the shaft 20. The looped end 22a is retained in the shaft 20 by a pin 24 which passes therethrough, and the webbing 22 is wound on the guide reel 18. A snap ring 26 is fixed to the left end of the shaft 20 which is projected from the wall portion 12c as will be understood from FIG. 3. With this, the reel guide 18 and the shaft 20 constitute a unit which is rotatable about the axis of the shaft 20 relative to the housing 12 in response to the winding and unwinding of the webbing on an off the guide reel 18. Located outside of the wall portion 12c is a return spring 28 which is held in a cover 30 firmly attached to the wall portion 12c in a suitable manner. An inner end 28a of the spring 28 is held in a slit 20b formed in the left end of the shaft 20 and an outer end 28b of the same is held in a slit (no numeral) formed in the cover 30 so that the shaft 20 and thus the guide reel 18 are biased to rotate in a direction to wind the webbing 22 thereon, that is in a clockwise direction in FIG. 1. As shown in the drawing, the right end portion of the shaft 20 has a ratchet wheel 32 fixed thereon and which is adapted to be housed in a cover 34 fixed in a suitable manner to the side wall portion 12a of the housing 12. Although not shown in the drawing, several known parts are also housed in the cover 34 to cooperate with the ratchet wheel 32 to form a so-called "Emergency Locking Mechanism" which functions to lock the shaft 20 thus stopping the feeding of the webbing 22 from the guide reel 18 when subjected to a shock caused by a vehicle collision.

Figure 3:
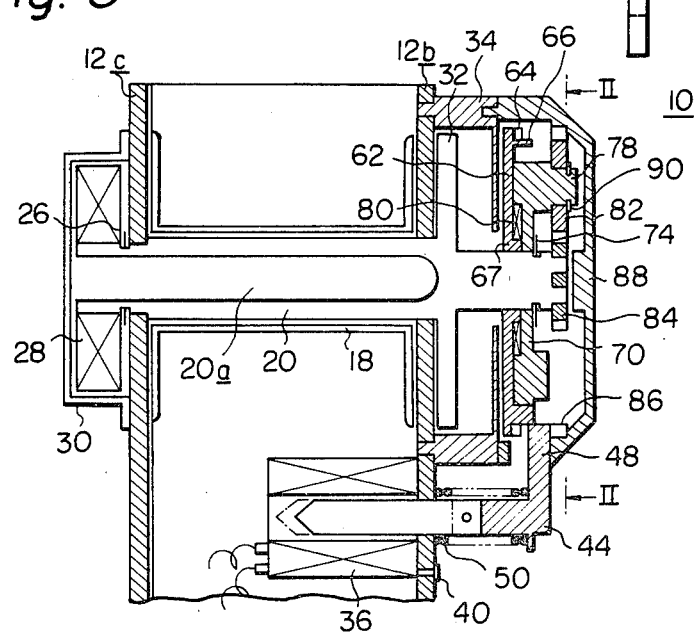
FIG. 3 is a sectional view taken along the line III—III of FIG. 2.

Indicated by numeral 36 is an electromagnetic actuator which is fixed at its one side to the inner lower section of the side wall portion 12b as is well understood from FIG. 3. An opening 38 is formed in the right wall portion 12b to pass therethrough a plunger 40 of the actuator 36. The plunger 40 is formed at its leading end with a slit 42 into which a thin edge portion 44a of a head member 44 is inserted. A pin 46 passes through the leading end of the plunger 40 and the thin edge portion 40 of the head member 44 to provide a secure connection between the plunger 40 and the head member 44. A detent 48 is mounted on the head member 44 to extend radially outward with respect to the plunger 40 of the actuator 36. A coil spring 50 is disposed about the plunger 40 between the outer surface of the right wall portion 12b and the head member 44 to bias the plunger 40 to move in the rightward direction in FIG. 1. In the embodiment hereinshown, the electromagnetic actuator 36 is so designed and constructed as to retract the plunger 40 toward the casing thereof when electrically energized and to allow the plunger 40 to project from the casing by force of the spring 50 when deenergized. As will be understood hereinlater, the detent 48 is engageable with an external gear (62) disposed on an extension of the shaft 20, to lock the same.

Figure 4:
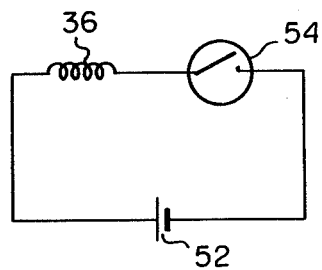
FIG. 4 is an electric circuit employed in the seat belt retractor of the invention.

As is understood from FIG. 4, the electromagnetic actuator 36 is connected to a battery 52 through a buckle switch 54 mounted in a buckle 56 (see FIG. 1). The buckle 56 is connected to the vehicle body or a vehicle seat via a bracket 58 and is engageable with a tongue 60 fixed to the webbing 22 to allow the webbing 22 to restrain the seated passenger while providing the electrical connection between the electromagnetic actuator 36 and the battery 52.

A rightward extension 20c of the shaft 20 projects outwardly through an opening 34a formed in the cover 34 as will be well understood from FIG. 1. Rotatably disposed about the extension 20c is an external gear 62 which has a plurality of external teeth 64 thereon and coaxial outer and inner sleeve portions 66 and 67 extending longitudinally outwardly with respect to the shaft 20. The sleeve portion 66 is provided at an inner surface thereof with a boss 68 projected diametrically. Within the sleeve portion 66 is disposed a discal carrier 70 which has a center opening 72 rotatably disposed on the extension 20c of the shaft 20 and is retained in place by a snap ring 74 fixed to the extension 20c, as is well understood from FIG. 1. The discal carrier 70 is formed at the cylindrical outer surface thereof with a projection 76 which is engageable with the before-mentioned boss 68 of the external gear 62, and at the right side surface thereof with a stud 78 parallel with the axis of the shaft 20. Disposed about the inner sleeve portion 67 of the external gear 62 is a spiral spring 80 which functions to bias the discal carrier 70 to rotate about the extension 20c of the shaft 20 in the clockwise direction in FIG. 1 with respect to the external gear 62, that is in the direction to allow the projection 76 of the carrier 70 to engage one side 68a of the boss 68 of the external gear 62.

A planetary gear 82 is rotatably disposed on the stud 78 of the discal carrier 70 and operatively engageable with a sun gear 84 which is fixedly connected to the rightmost end of the shaft 20. The planetary gear 82 is also operatively engageable with an internal gear 86 formed on the inner cylindrical surface of a cylindrical cap 88 which is mounted on the cover 34 to house therein the external gear 62, the discal carrier 70 and the planetary and sun gears 82 and 84, as is seen from FIG. 1. Denoted by numeral 90 is a snap ring for retaining the planetary gear 82 to the stud 78.

With the above, the seat belt retractor 10 of the first embodiment of the invention will operate as follows: (Description of the operation of the "Emergency Locking Mechansim" housed in the cover 34 will be omitted since the "Mechanism" is known to those skilled in the art.)

Figure 5:
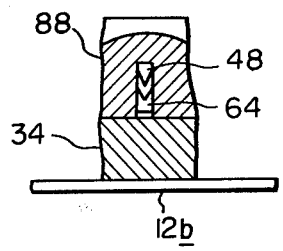
FIG. 5 is a sectional view depicting a meshing engagement between a stopping detent and an external gear.
Figure 6A:
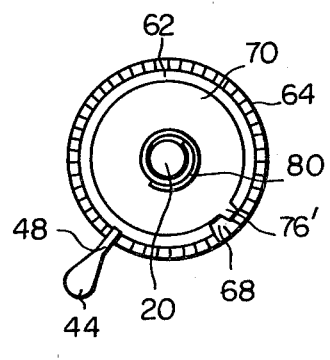
FIGS. 6A and 6B are sketches depicting movement of a discal carrier used in the seat belt retractor of the first embodiment.
Figure 6B:
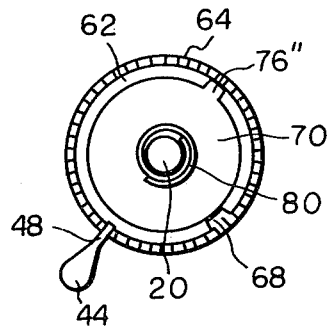

When the tongue 60 and the buckle 56 are kept disengaged causing deenergization of the electromagnetical actuator 36, the detent 48 on the plunger 40 of the actuator 36 takes the dormant position releasing the external gear 62 in a manner as is shown in FIG. 5. With this, the shaft 20 and thus the reel 18 are urged to wind thereon the webbing 22 by the force generated by the return spring 28. Under rotation of the reel 18 in the clockwise direction that is in the direction to wind thereon the webbing 22, the planetary gear 82 rotates about the center thereof in the counterclockwise direction while engaging with the internal gear 86, thereby being caused to orbit around the sun gear 84 in the clockwise direction. The orbital movement of the planetary gear 82 causes rotation of the discal carrier 70 around the extension 20c of the shaft in the clockwise direction, thereby inducing rotation of the external gear 62 around the extension 20c in the same direction as the discal carrier 70 due to engagement between the projection 76 and the side 68a of the boss 68. The winding operation of the retractor 10 continues until the webbing 22 is entirely wound up on the reel 18. Under this condition, the webbing 22 is drawn out from the reel 18 against the biasing force of the return spring 28 while rotating the discal carrier 70.

When the tongue 60 and the buckle 54 are engaged, after drawing out sufficient webbing from the reel 18 to permit donning of the webbing to restrain the seated passenger, the buckle switch 54 closes to cause energization of the electromagnetic actuator 36 thereby retracting the plunger 40 toward the casing of the actuator 36. Thus, the detent 48 on the plunger 40 is brought into locking engagement with one of the teeth 64 of the external gear 62 against the biasing force of the coil spring 50 thereby preventing rotation of the external gear 62 in clockwise and counterclockwise directions. The detent 48 on the plunger 40 and the external gear 62 cooperate to provide the seat belt retractor 10 with a position memory wherein the just mentioned engagement of the detent 48 and the external gear 62 establishes an initial "memorizing or memory" position. The operation and function of the position memory will become clearer as the disclosure proceeds.

Now, since the rotation of the external gear 62 is suppressed, the clockwise rotation of the discal carrier 70 about the extension 20c of the shaft 20 is prevented due to blocking engagement of the projection 76 with the side 68a of the boss 68. Thus, the webbing winding motion of the reel 18 by the return spring 28 is no more provided. This means that the passenger wearing the webbing 22 is applied with substantially no pressure from the webbing 22 as long as the passenger keeps his or her normal seated position viz, sits back against the backrest of the seat.

Under this condition, if the seated passenger leans forward as for example in opening the glove locker, the webbing 22 will be drawn off the reel 18 against the force of springs 80 and 28, rotating the reel 18 in the counterclockwise direction. Such counterclockwise rotation of the reel 18 is allowed since this rotation causes rotation of the discal carrier 70 in the counterclockwise direction that is in the direction to cause the projection 76 of the carrier 70 to move away from the boss 68 of the external gear 62. The counterclockwise rotation of the reel 18 is of course made against the biasing force of the return spring 28 and will cause the projection 76 of the carrier 70 to travel from a position as denoted by numeral 76' in FIG. 6A to, for example, a position as denoted by 76" in FIG. 6B. Of course, when the seated passenger stops moving forward, the projection 76 (or 76', 76") stops due to the non movement of the webbing 22.

When the wearer returns to the normal seated position, the length of the webbing 22 corresponding to the returning movement of the passenger is wound up on the reel 18 by the action of the return spring 28. During this winding motion of the reel 18, the projection 76 of the carrier 70 comes back to and finally presses upon the side 68a of the boss 68 of the external gear 62. Since the rotation of the external gear 62 is blocked by the detent 48, the engagement of the projection 72 with the boss 68 does not cause the rotation of the external gear 62. This means that the webbing 22 returns to its previously set or memorized position.

If the forward movement of the wearer from the normal position is quite pronounced, the projection 76 of the carrier 70 is finally brought into contact with the other side 68b of the boss 68. Under this, the webbing 22 is no more drawn off since the external gear 62 in this case is locked by the detent 48.

When the passenger disconnects the tongue 60 from the buckle 56, the electromagnetic actuator 36 becomes deenergized thereby disengaging the detent 48 from the external gear 62 by the aid of the biasing force of the spring 50. Thus, the shaft 20 and the reel 18 are permitted to rotate in the clockwise direction under the biasing force of the return spring 28, winding up thereon the webbing 22.

Now, it should be noted that if the vehicle on which the subject seat belt retractor 10 is mounted is subjected to a vehicle collision, the drawing of the webbing 22 out from the retractor 10 is completely suppressed by the function of the "Emergency Locking Mechanism" thereby to protect the webbing wearer from being thrown forwardly.

The following description is directed to the mathematical relationship established between the sun gear 84 fixed to the shaft 20 and the internal gear 86 formed in the cap 88.

Assuming that the number of teeth of the sun gear 84 and the internal gear 86 are "A" and "C", one turning of the sun gear 84 causing one turning of the reel 18 will cause the discal carrier 70 to rotate about the shaft 20 by $1/(1+C/A)$ times. This means that one turning of the discal carrier 70 causes the sun gear 84 and thus the reel 18 to rotate about the axis thereof by $(1+C/A)$ times.

Figure 2:
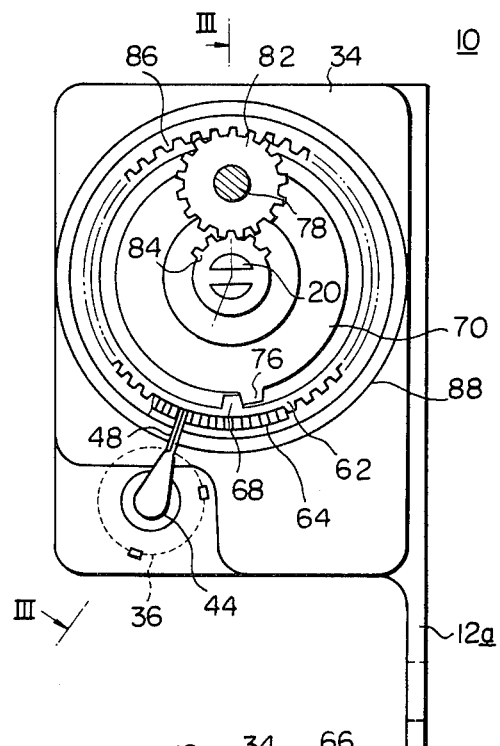
FIG. 2 is a side sectional view of the assembled seat belt retractor of FIG. 1, being a view taken along the line II—II of FIG. 3.

Thus, when the number "C" is selected to be considerably greater than the number "A" as is noted from FIG. 2, the rotation speed of the discal carrier 70 about the shaft 20 is remarkably reduced in comparison with that of reel 18 about the axis thereof. Thus, a considerable length of the webbing 22 can be drawn out from and retracted by the reel 18, without influencing the belt position memorization, even though the projection 76 of the carrier 70 has not a long travelling distance to the boss 68 of the external gear 62.

Figure 7:
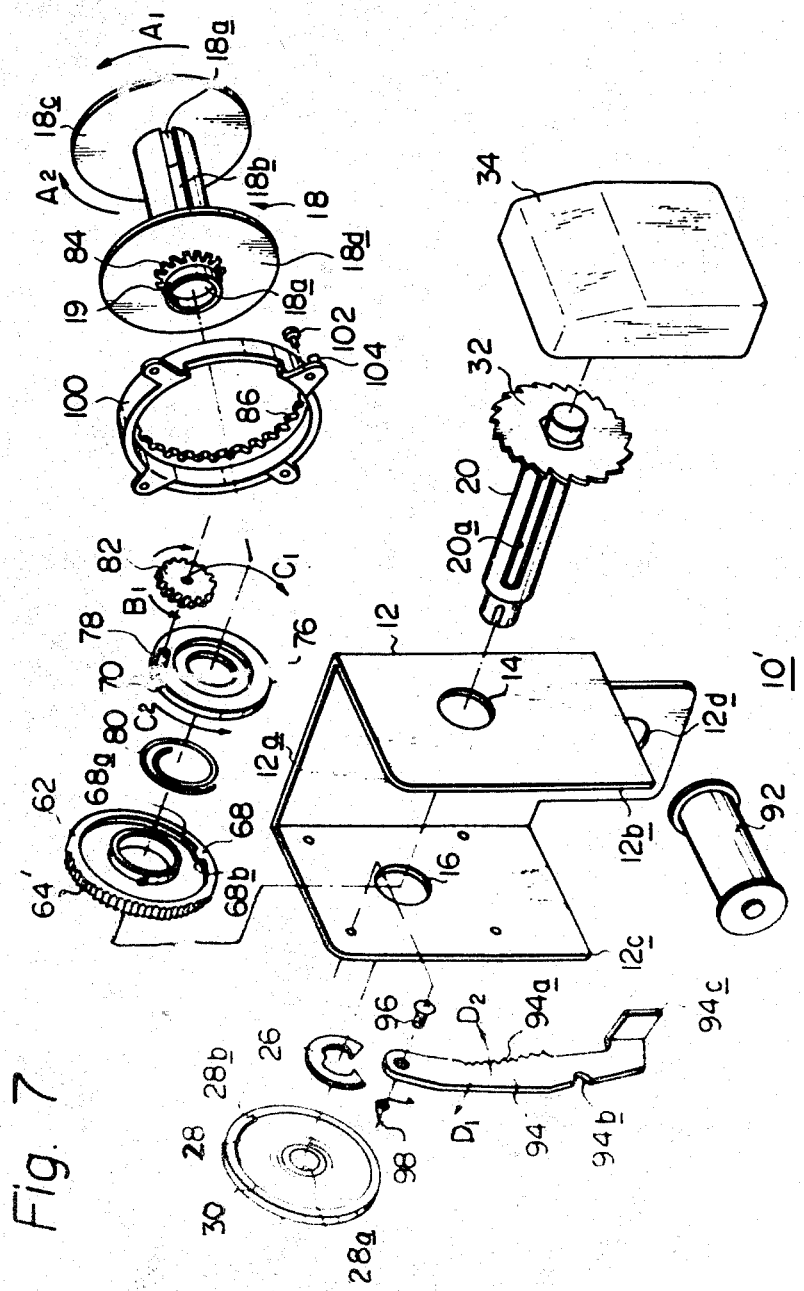
FIG. 7 is an exploded view of a seat belt retractor of a second embodiment according to the invention.
Figure 8:
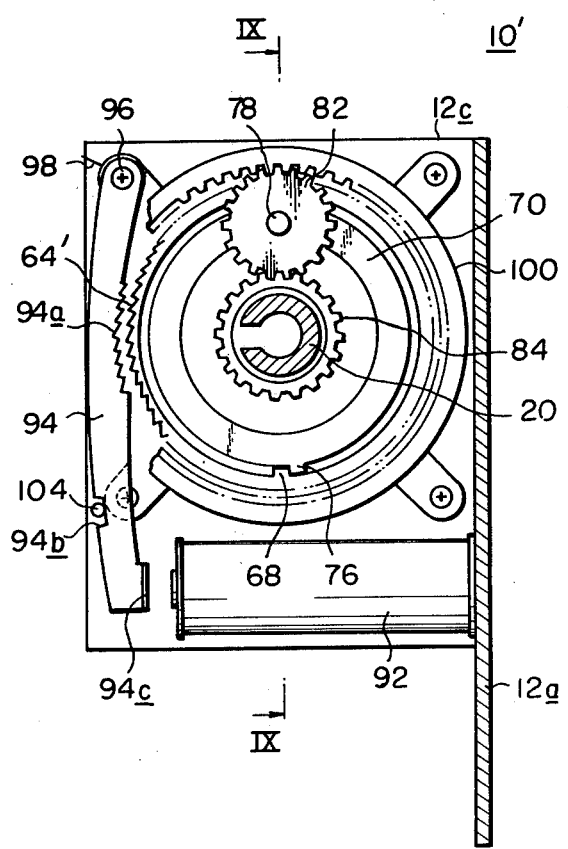
FIG. 8 is a side sectional view of the assembled seat belt retractor of FIG. 7, being a view taken along the line VIII-VIII of FIG. 9.
Figure 9:
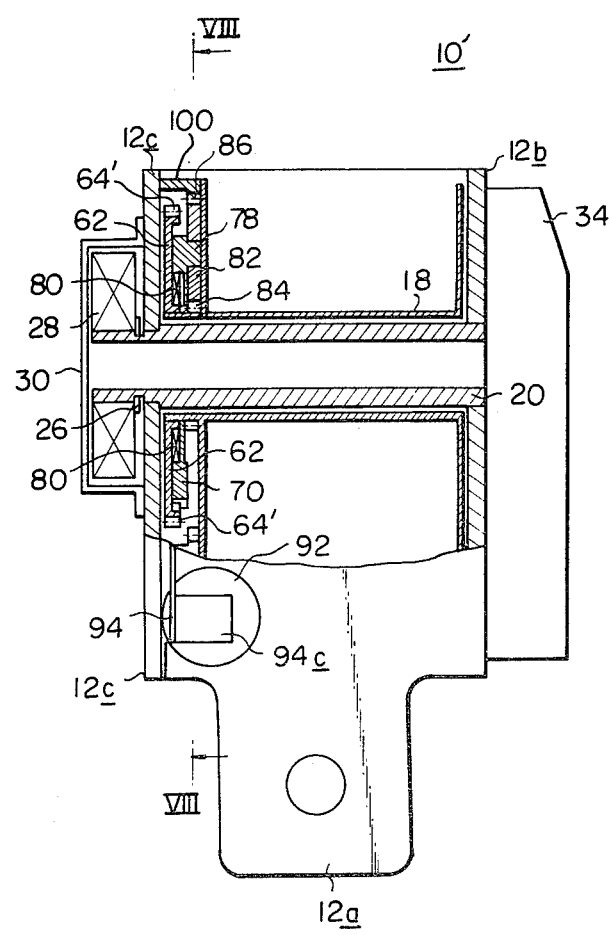
FIG. 9 is a sectional view taken along the line IX—IX of FIG. 8.

Referring to FIGS. 7 to 9, especially FIG. 7, there is illustrated a second embodiment of the seat belt retractor of the invention, which is generally designated by numeral 10'. For facilitation of drawings and description, substantially the same parts are denoted by the same numerals as in the case of the first embodiment and detailed explanation of which will be omitted from the following.

The seat belt retractor 10' of the second embodiment comprises a generally U-shaped housing 12. Wall portions 12b and 12c of the housing 12 respectively have aligned holes 14 and 16 and receive therebetween a guide reel 18 in a manner that the axis of the reel 18 is aligned with the holes 14 and 16. The guide reel 18 is provided at both longitudinal ends with circular flanges 18c and 18d. For the reason which will become clear hereinlater, the guide reel 18 is formed with a coaxial sleeve 19 which projects longitudinally outwardly from the flange 18d. A hollow shaft 20 passes through an axial hole 18a of the reel 18 with the ends thereof rotatably journaled in the holes 14 and 16. Although not shown in the drawings, a webbing (22) is fixed to the hollow shaft 20, passing through a longitudinally extending slit 18b of the reel 18 and through a slit 20a of the shaft 20, in the same manner as in the first embodiment mentioned before. A snap ring 26 is fixed to the left end of the shaft 20 which is projected from the wall portion 12c. A return spring 28 housed in a cover 30 operates to bias the shaft 20 and thus the reel 18 to rotate in the direction of arrow $A_1$, that is in a direction to wind thereon the webbing (22). A ratchet wheel 32 is tightly mounted on the right end portion of the shaft 20 which is projected from the hole 14. The ratchet wheel 32 is an element or part of the before-mentioned "Emergency Locking Mechanism" which is housed in a cover 34 fixed to the right wall portion 12b of the housing 12.

Indicated by numeral 92 is an electromagnet which is fixed at its one side to the inner lower section of the base portion 12a of the housing, as is well understood from FIG. 8. An arm 94 having at its lower part a lug 94c is pivotally connected at its upper end to an upper left section of the left wall portion 12c of the housing 12, via a bolt 96, in such a manner that the lug 94c is contactable to the other side of the electromagnet 92 when the arm 94 swings about the bolt 96 in a predetermined angle. The arm 94 is biased to swing in the direction of arrow "$D_1$" by means of a snap spring 98 which is disposed about the bolt 96 between the wall portion 12c and the arm 94. The rotation of the arm 94 in the direction "$D_1$" is limited by abutting a cut 94b formed therein against a pin (104) fixed to a later-mentioned ring member (100). The arm 94 is further formed at a portion facing the base portion 12a of the housing 12 with a toothed portion 94a. For the reason which will become clear hereinlater, each tooth of the toothed portion 94a has a saw-tooth form, as is well shown in FIG. 10B, which consists of a linear outward portion 94a-1 and a slanted portion 94a-2, the linear outward portion 94a-1 facing the bolt 96 about which the arm 94 is swingable. Although not shown in the drawings of this second embodiment, the electromagnet 92 is connected to a battery (52) via a buckle switch (54) in the same manner as in the case of the first embodiment, so that when the tongue (60) of the webbing (22) is engaged with the buckle 56 to restrain a seated passenger, the electromagnet 92 is energized to attract the arm 94 to allow the same to swing in the direction of arrow $D_2$ against the biasing force of the spring 98, and when the tongue (60) is disengaged from the buckle (56), the electromagnet 92 is deenergized to allow the arm 94 to swing in the direction of $D_1$ by the force of the spring 98.

As will be understood from the following description, several parts such as 84, 100, 82, 70, 80 and 62 are interposed or arranged between the left wall portion 12c of the housing and the left circular flange 18d of the reel 18. A sun gear 84 is unitedly mounted about the coaxial sleeve 19 of the reel 18 at a position near the circular flange 18d. Rotatably disposed about the sleeve 19 are a discal carrier 70 and an external gear 62 between which a spiral spring 80 is disposed for biasing the discal carrier 70 to rotate about the sleeve 19 in the direction of arrow $C_1$ with respect to the external gear 62, that is in a direction to allow a projection 76 of the carrier 70 to engage one side 68a of a boss 68 of the external gear 62. The external gear 62 is located in a position where the teeth 64' thereof are meshingly engageable with the toothed portion 94a of the arm 94 when the arm 94 swings toward the base portion 12a of the housing 12 in response to energization of the electromagnet 92. As is shown in FIG. 10B, each of the teeth 64' has a sawtooth form consisting of a outwardly linear portion 64'-1 and a slanted portion 64'-2 which portions are brought into contact with the linear outward portion 94a-1 and the slanted portion 94a-2 of the arm 94, respectively, upon engagement of the arm 94 with the external gear 62. The discal carrier 70 is provided at the right side surface thereof with a stud 78 on which a planetary gear 82 is rotatably disposed. The planetary gear 82 is operatively engaged with an internal gear 86 formed in a ring member 100 which is fixed at its flange portions (no numerals) to the inner surface of the left wall portion 12c of the housing 12, via bolts 102 (only one is shown). Mounted on one of the flange portions of the ring member 100 is a pin 104 to which the arm 94 more specifically the cut 94b of the same is engageable to limit the rotation of the arm 94 about the bolt 96, as has been described hereinbefore.

With the above, the seat belt retractor 10' of the second embodiment will operate as follows: (The explanation of operation will be made with reference to FIG. 7.)

When the tongue (60) and the buckle (56) are kept disengaged causing deenergization of the electromagnet 92, the arm 94 takes its dormant position wherein the toothed portion 94a thereof releases the external gear 62. With this, the shaft 20 and thus the reel 18 are urged to wind thereon the webbing (22) by the force generated by the return spring 28. Under rotation of the reel 18 in the direction to wind thereon the webbing (22) that is in the direction of arrow $A_1$, the planetary gear 82 rotates about the axis thereof in the direction of arrow $B_1$ while engaging with the internal gear 86 thereby being caused to orbit around the sun gear 84 in the direction of arrow $C_1$. This orbital movement of the planetary gear 82 causes rotation of the discal carrier 70 around the sleeve 19 in the same direction as the orbital movement of the gear 82, that is in the direction of arrow $C_1$, thereby inducing rotation of the external gear 62 around the sleeve 19 in the same direction ($C_1$) as the discal carrier 70 due to abutment of the projection 76 upon the side 68a of the boss 68 of the external gear 62. This winding operation of the retractor 10' continues until the webbing (22) is completely wound up on the reel 18. Under this condition, the webbing (22) can be drawn out from the reel 18 against the biasing force of the return spring 28, rotating the discal carrier 70 in the direction of arrow $C_2$. The rotation of the discal carrier 70 in such direction may cause rotation of the external gear 62 in the same direction as the carrier 70 because of the mechanical connection therebetween via the spiral spring 80.

When the tongue (60) and the buckle (56) are engaged, the buckle switch (54) closes causing energization of the electromagnet 92, so that the arm 94 is attracted by the magnet 92 against the force of the snap spring 98 to accomplish meshing engagement of the toothed portion 94a of the arm 94 with the teeth 64' of the external gear 62. Thus, rotation of the external gear 62 is prevented. For facilitation of below description, just mentioned engagement of the toothed portion 94a of the arm 94 and the external gear 62 will be referred to as an initial "memorizing or memory" position of the retractor 10'.

Now, since the rotation of the external gear 62 is blocked, the rotation of the discal carrier 70 in the direction of arrow $C_1$ is prevented due to blocking engagement between the projection 76 and the side 68a of the boss 68. Thus, the webbing winding motion of the reel 18 is no more provided. This means that the wearer is applied with substantially no pressure from the webbing (22) so long as the wearer keeps his or her normal seated position.

Under this condition, if the wearer leans slowly forward, the webbing (22) will be drawn off the reel 18 against the force generated by the springs 28 and 80, rotating the reel 18 in the direction of arrow $A_1$. Such rotation of the reel 18 is allowed since this rotation causes rotation of the discal carrier 70 in the direction $C_2$, that is in the direction to cause the projection to move away from the side 68a of the boss 68 of the external gear 62.

When the wearer returns to the normal seated position, the length of the webbing (22) corresponding to the returning movement of the wearer is wound up on the reel 18 by the action of the returning spring 28. During the winding motion of the reel 18, the projection of the carrier 70 comes back and finally abuts upon the one side 68a of the boss 68 so that the rotation of the carrier 70 is blocked. This means that the webbing (22) returns to its previously set or memorized position.

Now, according to the retractor 10' of the second embodiment, an advantage which is not expected by the first embodiment is achieved. For easy understanding of the advantage given by the second embodiment, a problem encountered in the first embodiment will be explained with the aid of FIG. 10A in which the arrangement between the detent 48 carried by the electromagnetic actuator 36 and the teeth 64 of the external gear 62 is shown.

Figure 10A:
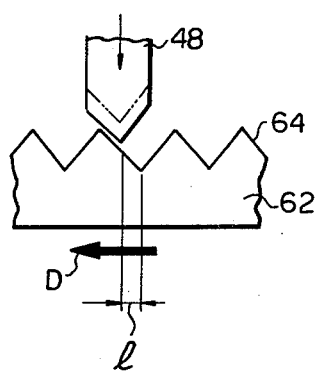
FIGS. 10A and 10B are respective sketches depicting operations executed by gear stopping mechanisms employed in the first and second embodiments of the invention.
Figure 10B:
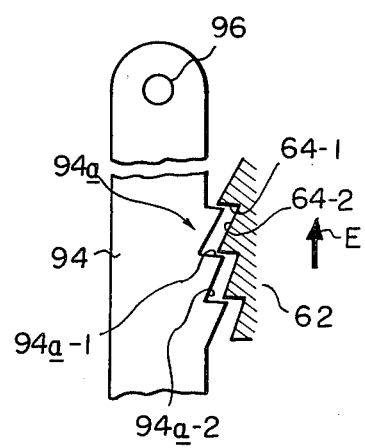

As will be understood from FIG. 10A, the movement of the detent 48 toward the teeth 64 of the external gear 62 from its dormant position (indicated by a phantom line) will cause the external gear 62 to rotate for the distance of l in the direction of arrow D. This induces that even when the tongue (60) and the buckle (56) are coupled to restrain the passenger, a certain length of the webbing (22) corresponding to rotation of the discal carrier 70 by the distance l is rewound by the reel 18, undesirably. Thus, slight pressure may be applied upon the wearer even when the wearer keeps his or her normal seated position.

In the retractor 10' of FIG. 10B of the second embodiment, however, the movement of the arm 94 toward the external gear 62 does not cause rotation of the external gear 62 in the direction of arrow E, even though such movement of the arm 94 may cause rotation of the same in the opposite direction. The suppression of the rotation of the external gear 62 in the direction E means that no rewinding motion of the reel 18 is provided once the tongue (60) and the buckle (56) are coupled. Thus, the webbing (22) applies on the wearer no pressure.

Figure 11:
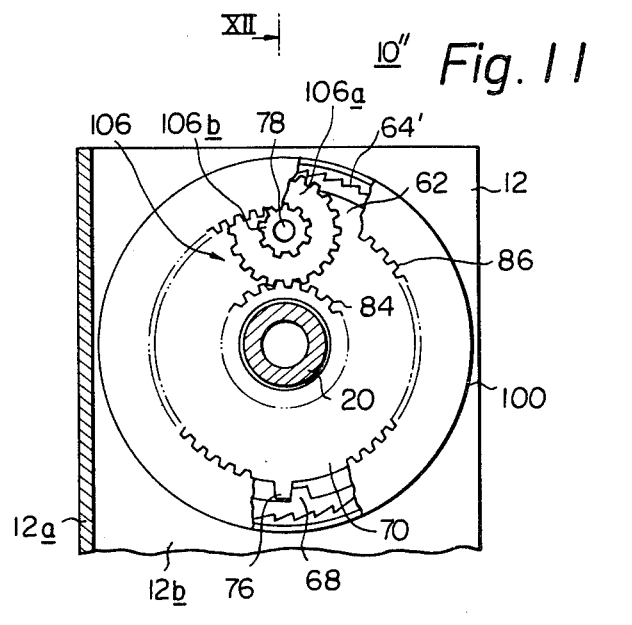
FIG. 11 is a side sectional view of an assembled seat belt retractor of a third embodiment according to the invention, being a view taken along the line XI—XI of FIG. 12.
Figure 12:
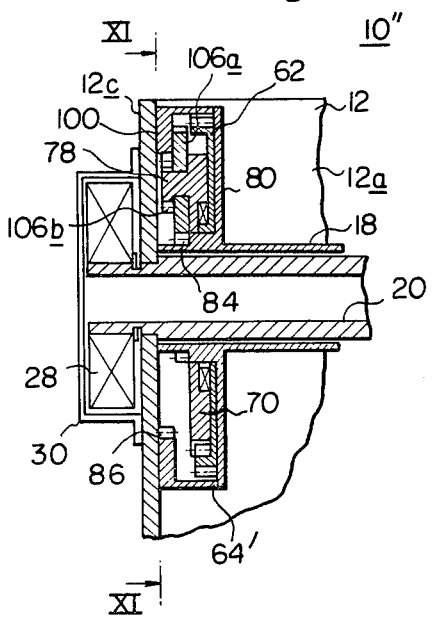
FIG. 12 is a sectional view taken along the line XII—XII of FIG. 11.

Referring to FIGS. 11 and 12, there is shown a third embodiment of the seat belt retractor of the invention, which is generally designated by numeral 10''. The construction of the retractor 10'' is very similar to the retractor 10' of the second embodiment mentioned above. Thus, only protions which are different from the retractor 10' of the second embodiment will be explained and in the drawings substantially the same parts will be denoted by the same numerals as in the case of the second embodiment.

In the third embodiment, a twin gear 106 is used as a substitute for the planetary gear 82 of the second embodiment for providing higher reduction ratio in rotation speed between the reel 18 and the discal carrier 70 so that much increased length of the webbing (22) can be drawn out from the reel 18, while keeping the belt position memorization. The twin gear 106 employed consists of a first gear portion 106a and a second gear portion 106b which is smaller in diameter than the first gear portion 106a and is coaxially mounted on the first gear portion 106a as well shown in FIG. 11. The twin gear 106 is journaled on the stud 78 extending from the discal gear 70 in such an arrangement that the first gear portion 106a is operatively engaged with the internal gear 86 formed in the ring member 100 and the second gear portion 106b is operatively engaged with the sun gear 84 mounted on the sleeve 19 of the reel 18.

Assuming that the numbers of teeth of the sun gear 84, the internal gear 86 of the ring member 100, the first gear portion 106a of the twin gear 106 and the second gear portion 106b of the same are "A", "C", "B$_1$" and "B$_2$", respectively, the reduction ratio in rotation speed between the reel (18) and the discal carrier (70) will be represented by $1/(1+B_1 \cdot C/A \cdot B_2)$. This means that one turning of the discal carrier 70 about the sleeve 19 causes the sun gear 84 and thus the reel 18 to rotate about the axis by $(1+B_1 \cdot C/A \cdot B_2)$ times. Thus, when the number "B$_1$" is selected to be greater than the number "B$_2$" as is understood from FIG. 11, the value $(1+B_1 \cdot C/A \cdot B_2)$ is considerably greater than the value $(1+C/A)$ which is mentioned before. Thus, greater length of the webbing (22) can be drawn out from and retracted by the reel 18, without influencing the belt position memorization, in comparison with the cases of the first and second embodiments.

The foregoing description shows only three preferred embodiments of the invention. Various modifications are apparent to those skilled in the art without departing from the scope of the subject invention which is only limited by the appended claims. Thereofore, the embodiments shown and described are only illustrative, not restrictive.

What is claimed is:

1. A belt retractor for a safety belt arrangement having a webbing and a housing, comprising:
    a shaft member axially rotatably mounted in said housing for winding thereon said webbing when rotated about the axis thereof in one direction;
    first biasing means for biasing said shaft member to rotate in said one direction;
    an external gear coaxial with said shaft member and rotatable about the axis of said shaft member;
    a stopper meshingly engageable with said external gear to lock the same with respect to said housing;
    second biasing means for biasing said stopper to move in a direction to be disengaged from said external gear;
    actuator for causing said stopper to be brought into meshing engagement with said external gear against the force of said second biasing means when said webbing takes a position wherein a passenger is restrained by said webbing;
    a discal member coaxial with said shaft member and rotatable about the axis of said shaft, member;
    first and second projections respectively mounted on said external gear and said discal member to be engageable with each other when said discal member is rotated in a direction about the axis thereof with respect to said external gear;
    third biasing means for biasing said discal member to rotate in said direction relative to said external gear;
    a stud member mounted on said discal member at a position away from the center of said discal member;
    a planetary gear journaled on said stud member;
    an internal gear tightly fixed to said housing and coaxially mounted around said shaft member; and
    a sun gear fixedly and coaxially mounted on said shaft member,
    said planetary gear being operatively interposed between said internal gear and said sun gear to be meshingly engaged with the same.

2. A belt retractor as claimed in claim 1, in which said first, second and third biasing means are springs.

3. A belt retractor as claimed in claim 1, in which said stopper has at least one tooth which is meshingly engageable with teeth formed on said external gear.

4. A belt retractor as claimed in claim 3, in which said tooth of said stopper is formed into a saw-tooth shape which consists of a linear portion and a slanted portion, and in which each of said teeth of said external gear is also formed into a saw-tooth shape which consists of a linear portion and a slanted portion, said linear portion of said stopper being brought into contact with said linear portion of one of the teeth of the external gear upon engagement between said stopper and said external gear.

5. A belt retractor as claimed in claim 1, in which said actuator is an electromagnetic device which moves said stopper toward said external gear to engage the same when electrically energized in response to completion of restraining the passenger with the webbing.

6. A belt retractor as claimed in claim 1, in which said planetary gear is a twin gear which consists of first and second gear portions which are coaxial with said each other, said second gear portion being smaller in diameter than said first gear portion, the first and second gear portions being operatively engaged with said internal gear and said sun gear, respectively.

7. A belt retractor as claimed in claim 1, further comprising an emergency locking mechanism which is co-operating with said shaft member to lock the same preventing the feeding of the webbing from said shaft member when a predetermined condition is sensed by said locking mechanism.

* * * * *